US006807579B1

(12) United States Patent
Frazier

(10) Patent No.: US 6,807,579 B1
(45) Date of Patent: Oct. 19, 2004

(54) METHOD, SYSTEM AND PROGRAM PRODUCTS FOR ASSIGNING AN ADDRESS IDENTIFIER TO A PARTITION OF A COMPUTING ENVIRONMENT

(75) Inventor: Giles R. Frazier, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 10/436,303

(22) Filed: May 12, 2003

(51) Int. Cl.[7] .............................................. G06F 15/16
(52) U.S. Cl. ...................... 709/245; 709/226; 709/220; 370/395.3
(58) Field of Search ................................. 709/215, 238, 709/242, 245, 226, 223, 220; 370/395.3

(56) References Cited

U.S. PATENT DOCUMENTS

| | | | |
|---|---|---|---|
| 4,564,903 A | 1/1986 | Guyette et al. | 364/300 |
| 4,843,541 A | 6/1989 | Bean et al. | 364/200 |
| 5,239,577 A | 8/1993 | Bates et al. | 379/201 |
| 5,564,040 A | 10/1996 | Kubala | 395/497.04 |
| 5,954,796 A | 9/1999 | McCarty et al. | 709/222 |
| 5,963,556 A | 10/1999 | Varghese et al. | 370/401 |
| 6,216,162 B1 * | 4/2001 | Dutcher et al. | 709/226 |
| 2002/0133573 A1 * | 9/2002 | Matsuda et al. | 709/220 |
| 2003/0189930 A1 * | 10/2003 | Terrell et al. | 370/389 |
| 2004/0093415 A1 * | 5/2004 | Thomas | 709/227 |
| 2004/0093430 A1 * | 5/2004 | Thomas | 709/245 |

OTHER PUBLICATIONS

"Fibre Channel Framing and Signaling (FC–FS)", rev. 1.7, INCITS Working Draft Standard Proposed for Information Technology, Chapter 22, pp. 433–439; Chapter 24, pp. 440–448, Feb. 8, 2002.
"Fibre Channel Generic Services–4 (FC–GS–4)", rev. 7.6, INCITS Working Draft Standard Proposed for Information Technology, Chapter 8, pp. 294–315, Dec. 19, 2002.
"Method and Apparatus for Obtaining Multiple Port Addresses by a Fibre Channel From a Network Fabric", pending U.S. patent application Ser. No. 10/006,948 filed Dec. 3, 2001.

* cited by examiner

Primary Examiner—Hong Kim
(74) Attorney, Agent, or Firm—Floyd A. Gonzalez, Esq.; Kevin P. Radigan, Esq.; Heslin Rothenberg Farley & Mesiti, P.C.

(57) ABSTRACT

Assignment of a unique address identifier to a partition of a computing environment is provided by extending the applicability of hunt groups. A single-member hunt group is initiated to provide an alias address (e.g., hunt group ID) which is associated with the partition of the computing environment. A token (or token and password) facilitates the association between the alias address and the partition. Subsequent communication between the partition and a fabric switch of the computing environment will use the alias address as a source or destination address identifier, thereby uniquely identifying the partition.

31 Claims, 4 Drawing Sheets

METHOD, SYSTEM AND PROGRAM PRODUCTS FOR ASSIGNING AN ADDRESS IDENTIFIER TO A PARTITION OF A COMPUTING ENVIRONMENT

CROSS-REFERENCE TO RELATED APPLICATION

This application contains subject matter which is related to the subject matter of the following application, which is assigned to the same assignee as this application. The below-listed application is hereby incorporated herein by reference in its entirety:

"METHOD AND APPARATUS FOR OBTAINING MULTIPLE PORT ADDRESSES BY A FIBRE CHANNEL FROM A NETWORK FABRIC," by Dugan et al., Ser. No. 10/006,948, filed Dec. 3, 2001.

FIELD OF THE INVENTION

The present invention relates, in general, to facilitating communications in a multi-partitioned computing environment, and more particularly, to assigning unique address identifiers to partitions within such an environment.

BACKGROUND OF THE INVENTION

Providing appropriate access to an input/output (I/O) device depends, in part, on knowing the precise source of an I/O command. For example, an I/O device that reserves its resources for exclusive use by a single logical partition (LPAR) needs to know whether an I/O command is sent from that particular LPAR. Under the Fibre Channel/SCSI (FCP) protocol, the source of a command sent from one LPAR of multiple LPARs supported by a host server channel adapter is the address identifier of the adapter's N_Port through which the command passes. Thus, commands from any of the multiple LPARs would have the same source address (i.e., the N_Port Address Identifier, or N_Port ID). This lack of unique identification accompanying a command prevents the destination (e.g., the I/O device) from knowing the precise source and, for example, adjusting access to its resources accordingly.

One way to provide unique N_Port IDs to each partition would be to include multiple channel adapters on the host server, sufficient to allow each LPAR to be associated with its own N_Port. Unfortunately, since it is not uncommon for a host server to have more than one thousand LPARs, the expense of providing a similar number of physical adapter cards makes this solution impractical.

There are other protocols which result in an N_Port having more than one ID, such as when an N_Port receives multicast frames (sent to a multicast address) as well as frames sent to its own N_Port address. These other protocols are specifically designed for unique purposes (such as multicast), and have limitations which result from the specific function provided. For example, multicast addresses are shared by all N_Ports in the multicast group, but an address used by a logical partition must only be usable by that logical partition.

Another potential method of obtaining another N_Port ID could be achieved by allowing the N_Port to log in multiple times with the fabric, but this would require initialization of flow-control buffers, and would therefore disrupt the operation of preexisting N_Ports with other N_Port IDs.

There thus remains a need in the art for an enhanced technique of providing, for example, a single physical N_Port with multiple address identifiers in order to allow each LPAR sharing the N_Port its own unique address identifier.

SUMMARY OF THE INVENTION

The shortcomings of the prior art are overcome and additional advantages are provided through the provision of a method for assigning an address identifier to a partition of a computing environment. The method includes, for instance, receiving, at an alias server of a fabric of the computing environment, a request sent by a partition to initiate assignment of an address identifier; responsive to receiving the request, obtaining, by the alias server, an alias address uniquely identifying a single-member hunt group to be associated with the partition sending the request; and forwarding the alias address from the alias server to the partition sending the request, thereby providing the partition with a single-member hunt group uniquely identified by the alias address and associated with the partition to be used in future communications, wherein the alias address comprises an address identifier for the partition.

Systems and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a facility is provided which enables a partition to obtain a unique address identifier for use in communications between the partition and peripheral units. In particular, communication is facilitated by defining a single-member hunt group uniquely identified by an address identifier. This hunt group address identifier is then provided by an alias server to the partition for use as its unique address identifier.

Figure 1:
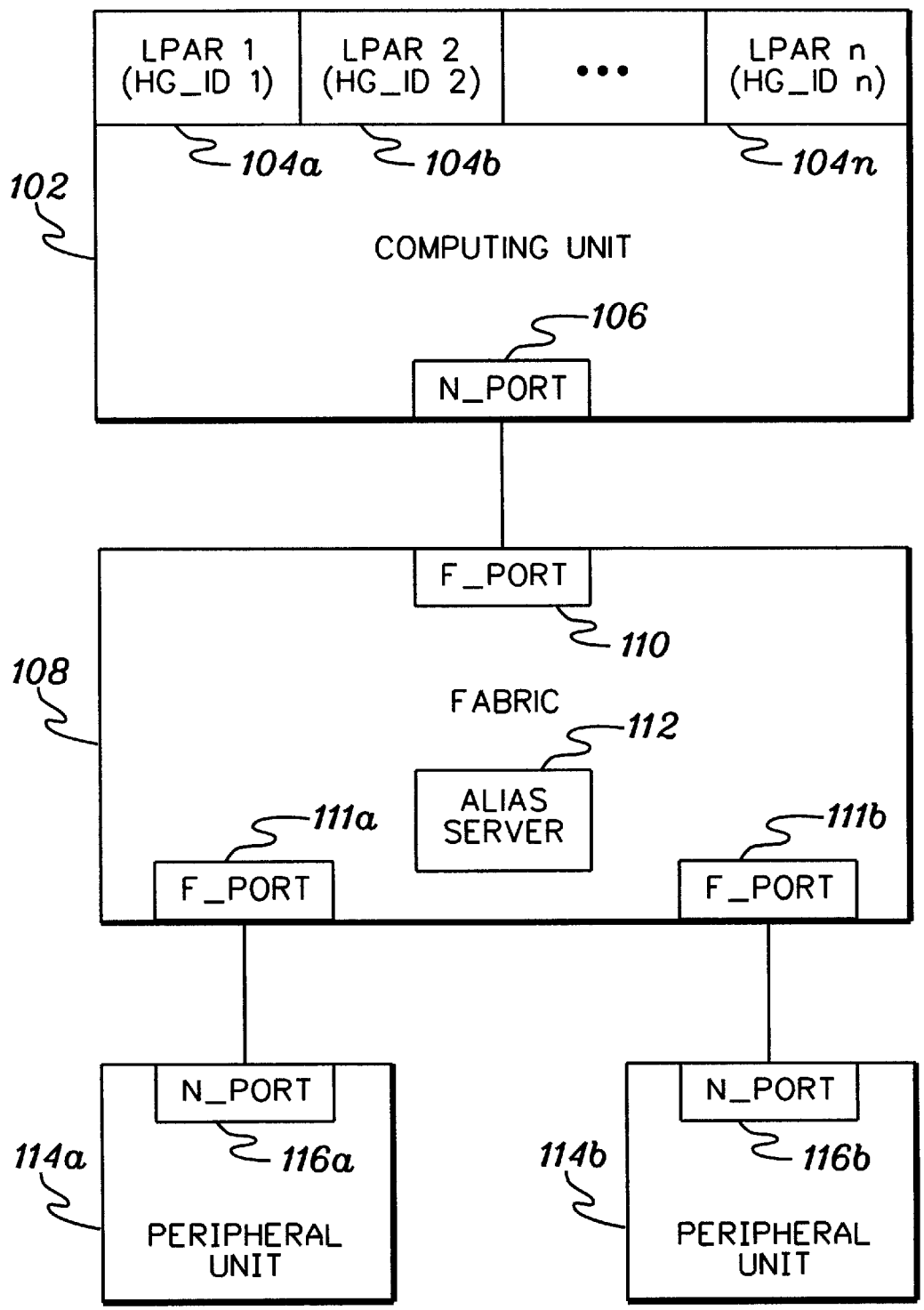
FIG. 1 is a block diagram of one embodiment of a computing environment to incorporate and use one or more aspects of the present invention.

One embodiment of a computing environment, generally denoted 100, incorporating and using one or more aspects of the present invention is first described with reference to FIG. 1. Computing environment 100 can be based, for instance, on the z/Architecture offered by International Business Machines Corporation, Armonk, N.Y. The z/Architecture is described in an IBM® publication entitled, "z/Architecture Principles of Operation," IBM Publication No. SA22-7832-00, December 2000, which is hereby incorporated herein by reference in its entirety. (IBM® is a registered trademark of International Business Machines Corporation, Armonk, N.Y., U.S.A. Other names used herein may be registered trademarks, trademarks, or product names of International Business Machines Corporation or other companies). In one example, a computing environment based on the z/Architecture includes an eServer zSeries, offered by International Business Machines Corporation, Armonk, N.Y.

As shown, computing environment 100 includes, for example, a computing unit 102 (e.g., a host or server), which includes, for instance, one or more partitions or zones 104a–104n (e.g., logical partitions LPAR 1–LPAR n) and a port 106 (e.g., N_Port), each of which is described below. In another example, a plurality of ports 106 can be included in computing unit 102.

Each logical partition 104 is capable of functioning as a separate system. That is, each logical partition can be independently reset, initially loaded with an operating system, if desired, and operate with different programs. An operating system or application program running in a logical partition appears to have access to a full and complete computer system, but in reality, only a portion of it is available. A combination of hardware and Licensed Internal Code (commonly referred to as microcode) keeps a program in a logical partition from interfering with a program in a different logical partition. This allows several different logical partitions to operate on a single physical processor in a time sliced manner. In this particular example, each logical partition has a resident operating system (not shown), which may differ for one or more logical partitions. In one embodiment, a resident operating system may be the z/OS operating system, offered by International Business Machines Corporation, Armonk, N.Y.

Further details regarding logical partitions are described in, for instance, Guyette et al., U.S. Pat. No. 4,564,903, entitled "Partitioned Multiprocessor Programming System", issued on Jan. 14, 1986; Bean et al., U.S. Pat. No. 4,843,541, entitled "Logical Resource Partitioning Of A Data Processing System", issued on Jun. 27, 1989; and Kubala, U.S. Pat. No. 5,564,040, entitled "Method And Apparatus For Providing A Server Function In A Logically Partitioned Hardware Machine", issued on Oct. 8, 1996, each of which is hereby incorporated herein by reference in its entirety.

Computing unit 102 can be identified by, for example, N_Port 106 (e.g., server N_Port), which has, for instance, a 3-byte identifier (i.e., N_Port identifier or N_Port ID). Peripheral units 114a, 114b (e.g., input/output devices) may also be identified by, for example, N_Ports 116a, 116b, respectively. Communications between computing unit 102 and peripheral units 114 can be transmitted by frames (i.e., data packets that include, for example, input/output commands). Each frame carries an identifier (e.g., the N_Port ID) of the destination of that frame. For example, if computing unit 102 is the destination of a frame, that frame carries the N_Port ID of N_Port 106. Such frame-based communications can also occur between partitions 104 residing on computing unit 102 and peripheral units 114.

Within environment 100, communications are transmitted across a fabric switch 108 (i.e., "fabric"), shown positioned between computing unit 102 and peripheral units 114. More particularly, communications pass between, for example, N_Port 106 and an F_Port 110 residing on fabric 108, and between F_Ports 111a and 111b and N_Ports 116a and 116b, respectively. One example of a fabric 108 is a fibre channel switch, such as a FICON Director offered by McData Corporation of Broomfield, Colo., and Inrange Technologies Corporation of Lumbertown, N.J. Communications in computing environments having fabrics are described in detail in "Fibre Channel Framing and Signaling (FC-FS)", rev. 1.70, NCITS Working Draft Proposed American National Standard for Information Technology, Feb. 8, 2002, and "Fibre Channel Generic Services-4 (FC-GS-4)", rev. 7.6, INCITS Working Draft Proposed American National Standard for Information Technology, Dec. 19, 2002, each of which is hereby incorporated herein by reference in its entirety.

Fabric 108 includes an alias sever 112, which manages the assignment of alias addresses (i.e., alias identifiers or alias IDs). An alias address is an address that is conventionally associated with one or more N_Ports, which are included in an alias group. The alias address is an identifier for an associated N_Port, in addition to the identifier provided by the N_Port ID of the N_Port. For example, a frame can be directed to N_Port 106 if the destination address of the frame is the N_Port ID of N_Port 106, or if the destination address is an alias address associated with N_Port 106. Alias server 112, along with alias groups and alias addresses, are described in detail in the above-incorporated publications "Fibre Channel Framing and Signaling (FC-FS)", rev. 1.70, NCITS Working Draft Proposed American National Standard for Information Technology, Feb. 8, 2002, and "Fibre Channel Generic Services-4 (FC-GS-4)", rev. 7.6, INCITS Working Draft Proposed American National Standard for Information Technology, Dec. 19, 2002.

Figure 2:
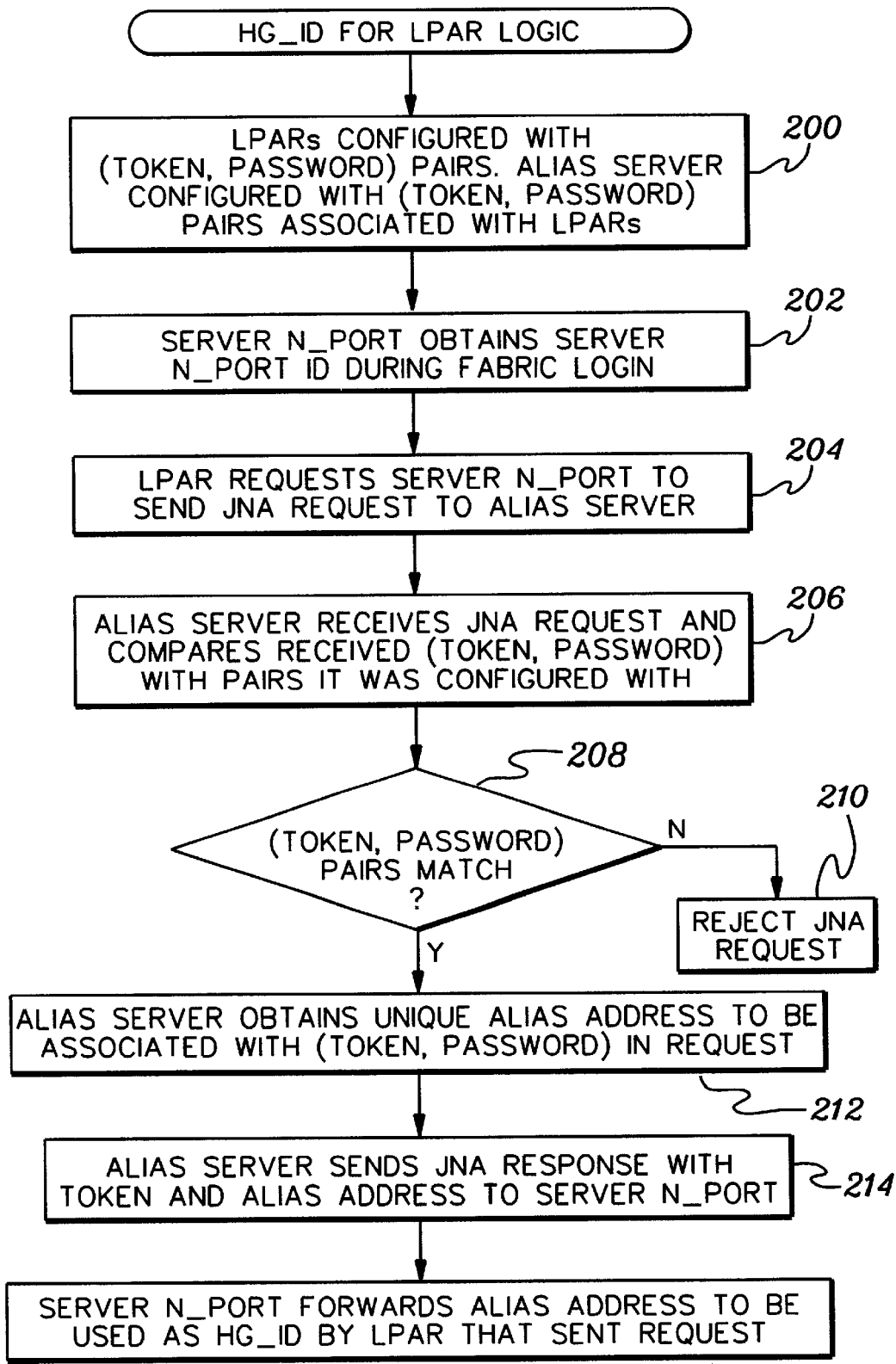
FIG. 2 is a flowchart of one embodiment of a process for assigning a unique address identifier (e.g., a single-member hunt group ID) to a partition of a computing environment, in accordance with an aspect of the present invention.

One embodiment of logic associated with assigning a unique address identifier to a partition, in accordance with an aspect of the present invention, is depicted in FIG. 2. This process of assigning a unique address identifier, which assumes a computing environment such as depicted in FIG. 1, begins with a configuration process 200 for the LPARs and alias server. In this example, the LPARs are configured with token and password pairs. The alias server is configured with potential token, password pairs to be associated with the LPARs. A token is a number (e.g., a 12-byte number) used to identify a particular LPAR when requesting formation of an alias group. To ensure that no other LPAR is associated with a particular alias group, the token used by the LPAR associated with the alias group is known only to that LPAR. No other LPAR can use the token unless it "guesses," for example, the 12-byte token. A more secure method of ensuring that only one LPAR uses a given token is to pair a password (e.g., a 12-byte number) with the token. A token, password pair thus provides a greater number of bytes (e.g., a 24-byte pair), and makes it more difficult for another LPAR to "guess" the particular token and password. Additional security is provided by the above-noted preconfiguration of alias server 112 with the token, password pairs to be used by each LPAR. Using this preconfiguration, alias server 112 does not assign an alias address unless it has been preconfigured with the particular token, password pair sent in a request to form an alias group. In another embodiment, these additional security measures might not be implemented, i.e., the partitions could be configured with a token only (e.g., configured with a 12-byte number only).

During fabric login 202, N_Port 106 of computing unit 102 obtains an N_Port ID. Fabric login is performed by N_Port 106 with the attached F_Port 110 of fabric 108, and is described in detail in the above-incorporated publication entitled "Fibre Channel Framing and Signaling (FC-FS)", rev. 1.70, NCITS Working Draft Proposed American National Standard for Information Technology, Feb. 8, 2002.

In order to obtain a unique address identifier, LPAR 104 requests that a join alias group (JNA) request be sent 204 by server N_Port 106 to alias server 112. A JNA request creates a new alias group (e.g., a hunt group). A hunt group is a collection of one or more N_Ports which is addressed using a particular alias address (i.e., a hunt group identifier; a.k.a. hunt group ID or HG_ID). An N_Port may be a member of multiple hunt groups and may be addressed by either its N_Port ID or any one of its hunt group IDs. For frames being routed via fabric 108, a frame that enters fabric 108 is routed to a single destination N_Port in the hunt group. Hunt groups and JNA requests are described in detail in the above-incorporated publications entitled "Fibre Channel Framing and Signaling (FC-FS)", rev. 1.70, NCITS Working Draft Proposed American National Standard for Information Technology, Feb. 8, 2002 and "Fibre Channel Generic Services-4 (FC-GS-4)," rev. 7.6, INCITS Working Draft Proposed American National Standard for Information Technology, Dec. 19, 2002.

Figure 4:
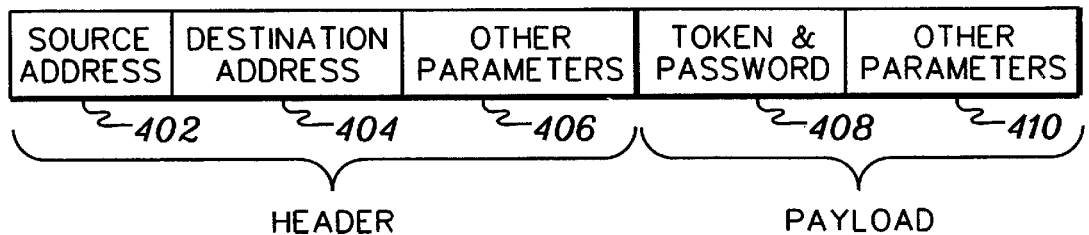
FIG. 4 depicts one embodiment of a join alias group request, in accordance with an aspect of the present invention.

FIG. 4 depicts one example of the fields in a JNA request. The header fields in a JNA request 400 include a source address 402 and a destination address 404. The payload fields of JNA request 400 include a token and password field 408. Other parameters 406, 410 are included in the JNA request and are described in detail in the above-incorporated publications entitled "Fibre Channel Framing and Signaling (FC-FS)", rev. 1.70, NCITS Working Draft Proposed American National Standard for Information Technology, Feb. 8, 2002, and "Fibre Channel Generic Services-4 (FC-GS-4)", rev. 7.6, INCITS Working Draft Proposed American National Standard for Information Technology, Dec. 19, 2002.

Continuing with the process of FIG. 2, upon receipt of a JNA request, the alias server compares the received token, password pair with the potential token, passwords pairs with which it had been configured 206. This comparison results in a determination of whether any pairs match 208. That is, alias server 112 determines whether any of its potential token, password pairs match the token, password pair in the JNA request 400. If no such match is found, the JNA request is rejected 210.

Figure 5:
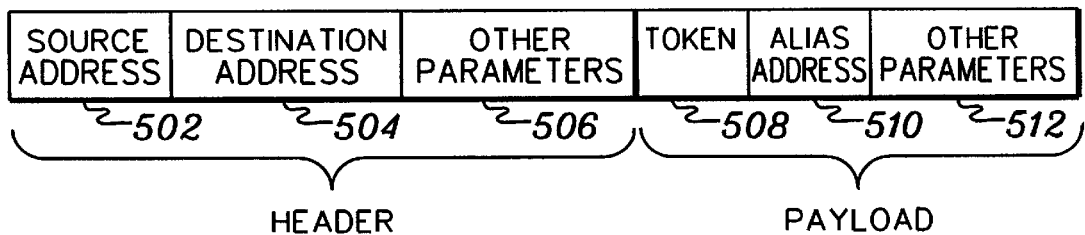
FIG. 5 depicts one embodiment of a join alias group response, in accordance with an aspect of the present invention.

If a token, password match is found, a unique alias address is obtained 212 by alias server 112 and is associated with the token, password pair in the JNA request 400. After obtaining the unique alias address, a JNA response is sent 214 from alias server 112 to server N_Port 106. FIG. 5 depicts one example of certain fields of a JNA response. The header fields of JNA response 500 include a source address 502 and a destination address 504, while the payload fields of JNA response 500 include a token 508 and an alias ID 510. The token field 508 includes the particular token with which the LPAR was configured 200, and alias ID field 510 includes the unique alias ID which alias server 112 obtained 212. This alias ID is to be used as a single member hunt group ID by the LPAR whose token was in the corresponding JNA request. The remaining parameters 506, 512 in JNA response 500 are described in the above-incorporated publication entitled "Fibre Channel Generic Services-4 (FC-GS-4)," rev. 7.6, INCITS Working Draft Proposed American National Standard for Information Technology, Dec. 19, 2002.

Figure 3:
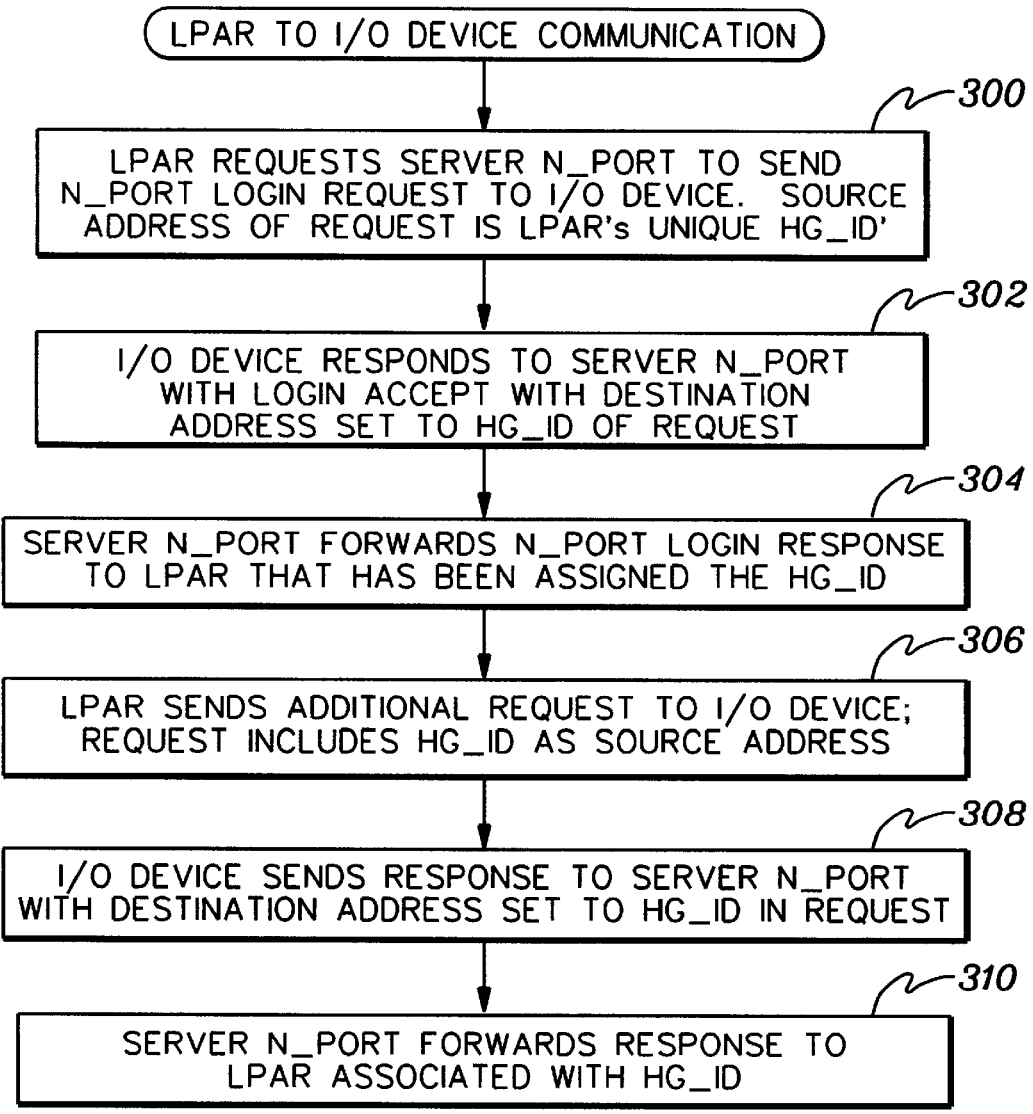
FIG. 3 is a flowchart of one embodiment of a partition communicating with an I/O device using a single-member hunt group ID, in accordance with an aspect of the present invention.

Returning to FIG. 2, when server N_Port 106 receives JNA response 500, the alias ID is forwarded 216 to the LPAR 104 that initiated the sending of the corresponding JNA request. At this point, the LPAR has its own unique address identifier (i.e., the hunt group ID or alias ID), which it subsequently uses to identify itself when communicating with other N_Ports attached to the fabric, such as N_Port 116a on peripheral unit 114a. One embodiment of this LPAR communication with other N_Ports is described below with reference to FIG. 3.

Partition-to-I/O device communication begins with, for example, LPAR 104a requesting computing unit's N_Port 106 to send an N_Port login request 300 to a I/O device 114a. The source address of the N_Port login request is the LPAR's unique hunt group ID, obtained (for example) as discussed above in connection with FIG. 2. Thereafter, I/O, device 114a sends a login accept 302 as a response to N_Port 106. This login accept includes a destination address set to the hunt group ID of the N_Port login request. Following the login request and login accept, N_Port 106 forwards an N_Port login response 304 to the LPAR 104a that has been assigned the particular hunt group ID.

After the N_Port login 300, 302 with the I/O device is complete, LPAR 104a can begin further communications with I/O device 114a by sending additional device requests 306, each of which contains the LPAR's hunt group ID as the source address. The I/O device replies by sending a response 308 to server N_Port 106 with the destination address set to the hunt group ID which was used as the source address in the respective request. Upon receipt of a device response, server N_Port 106 forwards the device response 310 to the LPAR associated with the hunt group ID included in the response.

Those skilled in the art will note from the above discussion that one or more aspects of the present invention advantageously provide a facility for assigning a unique address to a partition, which is then used to uniquely identify the partition when performing I/O operations. This enables, for example, I/O devices to reserve resources for exclusive use by particular partitions. Further, the facility for assigning a unique address identifier disclosed herein employs a new application of hunt groups without requiring a modification of the existing Fibre Channel standards. This new application of hunt groups also provides an alternate technique for obtaining multiple address identifiers associated with a port when either the fabric or the host computing unit does not support the technique described in the above-incorporated "Method and Apparatus for Obtaining Multiple Port Addresses by a Fibre Channel from a Network Fabric", by Dugan et al., Ser. No. 10/006,948, filed Dec. 3, 2001. Still further, this new hunt group application does not preclude the simultaneous use of hunt groups in a conventional manner, thereby providing the advantages described herein, while also providing advantages of conventionally-used hunt groups (e.g., load balancing among different routes through a fabric). Moreover, as noted above, preventing the assignment of additional address identifiers except when a request includes an appropriate token and password pair provides additional security that no two partitions share the same hunt group ID.

The present invention can be included in an article of manufacture (e.g., one or more computer program products) having, for instance, computer usable media. The media has embodied therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine, embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of assigning an address identifier to a partition of a computing environment, said method comprising:
   receiving, at an alias server of a fabric of the computing environment, a request sent by a partition to initiate assignment of an address identifier;
   responsive to receiving the request, obtaining by the alias server an alias address uniquely identifying a single-member hunt group to be associated with the partition sending the request; and
   forwarding the alias address from the alias server to the partition sending the request, thereby providing the partition with the single-member hunt group uniquely identified by the alias address and associated with the partition to be used in future communications, wherein the alias address comprises the address identifier.

2. The method of claim 1, wherein the request to initiate assignment of the address identifier comprises a token associated with the partition.

3. The method of claim 2, wherein the forwarding the alias address comprises sending a response to the request to initiate assignment of the address identifier, the response including the alias address and the token included in the request.

4. The method of claim 1, wherein the request to initiate assignment of the address identifier comprises a token concatenated with a password.

5. The method of claim 1, wherein the single-member hunt group comprises a physical port on a computing unit on which the partition resides.

6. The method of claim 1, wherein said method further comprises preconfiguring the alias server with at least one potential token for at least one partition of the computing environment, and wherein said obtaining comprises obtaining the alias address if a token associated with the partition and included in the request matches a potential token of the at least one potential token preconfigured at the alias server.

7. The method of claim 6, wherein said method further comprises rejecting the request if the token associated with the partition and included in the request does not match a potential token of the at least one potential token preconfigured at the alias server.

8. The method of claim 1, further comprising subsequent to said forwarding of the alias address, at least one of (i) using the alias address as a source address in a communication from the partition to the fabric and (ii) using the alias address as a destination address in a communication from the fabric to the partition.

9. The method of claim 1, wherein the fabric resides between a computing unit and at least one input/output device, wherein the computing unit includes the partition.

10. The method of claim 1, wherein the partition comprises one partition of a plurality of partitions of the computing environment, and said method further comprises repeating said receiving, said obtaining and said forwarding responsive to multiple requests sent by multiple partitions of the plurality of partitions to initiate assignment of address identifiers to the multiple partitions.

11. A system for assigning an address identifier to a partition of a computing environment, said system comprising:
    means for receiving, at an alias server of a fabric of the computing environment, a request sent by a partition to initiate assignment of an address identifier;
    means for obtaining by the alias server, responsive to receiving the request, an alias address uniquely identifying a single-member hunt group to be associated with the partition sending the request; and
    means for forwarding the alias address from the alias server to the partition sending the request, thereby providing the partition with the single-member hunt group uniquely identified by the alias address and associated with the partition to be used in future communications, wherein the alias address comprises the address identifier.

12. The system of claim 11, wherein the request to initiate assignment of the address identifier comprises a token associated with the partition.

13. The system of claim 12, wherein the means for forwarding the alias address comprises means for sending a response to the request to initiate assignment of the address identifier, the response including the alias address and the token included in the request.

14. The system of claim 11, wherein the request to initiate assignment of the address identifier comprises a token concatenated with a password.

15. The system of claim 11, wherein the single-member hunt group comprises a physical port on a computing unit on which the partition resides.

16. The system of claim 11, wherein said system further comprises means for preconfiguring the alias server with at least one potential token for at least one partition of the computing environment, and wherein the means for obtaining comprises means for obtaining the alias address if a token associated with the partition and included in the request matches a potential token of the at least one potential token preconfigured at the alias server.

17. The system of claim 16, wherein said system further comprises means for rejecting the request if the token associated with the partition and included in the request does not match a potential token of the at least one potential token preconfigured at the alias server.

18. The system of claim 11, further comprising at least one of (i) means for using, subsequent to said forwarding, the alias address as a source address in a communication from the partition to the fabric and (ii) means for using, subsequent to said forwarding, the alias address as a destination address in a communication from the fabric to the partition.

19. The system of claim 11, wherein the fabric resides between a computing unit and at least one input/output device, wherein the computing unit includes the partition.

20. The system of claim 11, wherein the partition comprises one partition of a plurality of partitions of the computing environment, and said system further comprises means for repeating said means for receiving, said means for obtaining and said means for forwarding responsive to multiple requests sent by multiple partitions of the plurality of partitions to initiate assignment of address identifiers to the multiple partitions.

21. A system for assigning an address identifier to a partition of a computing environment, said system comprising:

an alias server adapted to receive a request sent by a partition to initiate assignment of an address identifier, and to obtain, responsive to receiving the request, an alias address uniquely identifying a single-member hunt group to be associated with the partition sending the request; and wherein said alias server is further adapted to forward the alias address to the partition sending the request, thereby providing the partition with the single-member hunt group uniquely identified by the alias address and associated with the partition to be used in future communications, and wherein the alias address comprises the address identifier.

22. At least one program storage device readable by a machine, tangibly embodying at least one program of instructions executable by the machine to perform a method of assigning an address identifier to a partition of a computing environment, said method comprising:

receiving, at an alias server of a fabric of the computing environment, a request sent by a partition to initiate assignment of an address identifier;

responsive to receiving the request, obtaining by the alias server an alias address uniquely identifying a single-member hunt group to be associated with the partition sending the request; and forwarding the alias address from the alias server to the partition sending the request, thereby providing the partition with the single-member hunt group uniquely identified by the alias address and associated with the partition to be used in future communications, wherein the alias address comprises the address identifier.

23. The at least one program storage device of claim 22, wherein the request to initiate assignment of the address identifier comprises a token associated with the partition.

24. The at least one program storage device of claim 23, wherein the forwarding the alias address comprises sending a response to the request to initiate assignment of the address identifier, the response including the alias address and the token included in the request.

25. The at least one program storage device of claim 22, wherein the request to initiate assignment of the address identifier comprises a token concatenated with a password.

26. The at least one program storage device of claim 22, wherein the single-member hunt group comprises a physical port on a computing unit on which the partition resides.

27. The at least one program storage device of claim 22, wherein the obtaining comprises obtaining the alias address if a token associated with the partition and included in the request matches a token configured in the alias server.

28. The at least one program storage device of claim 27, wherein said method further comprises rejecting the request if the token associated with the partition and included in the request does not match a potential token of the at least one potential token preconfigured at the alias server.

29. The at least one program storage device of claim 22, wherein said method further comprises, subsequent to said forwarding of the alias address, at least one of (i) using the alias address as a source address in a communication from the partition to the fabric and (ii) using the alias address as a destination address in a communication from the fabric to the partition.

30. The at least one program storage device of claim 22, wherein the fabric resides between a computing unit and at least one input/output device, wherein the computing unit includes the partition.

31. The at least one program storage device of claim 22, wherein the partition comprises one of a plurality of partitions of the computing environment, and said method further comprises repeating said receiving, said obtaining and said forwarding responsive to multiple requests sent by multiple partitions of the plurality of partitions to initiate assignment of address identifiers to the multiple partitions.

* * * * *